(12) United States Patent
Turck

(10) Patent No.: US 8,801,341 B2
(45) Date of Patent: Aug. 12, 2014

(54) TRANSPORT SYSTEM AND GUIDE SYSTEM FOR SUCH A TRANSPORT SYSTEM

(76) Inventor: Pieter Turck, Kapellen (BE)

( * ) Notice: Subject to any disclaimer, the term of this patent is extended or adjusted under 35 U.S.C. 154(b) by 658 days.

(21) Appl. No.: 13/116,252

(22) Filed: May 26, 2011

(65) Prior Publication Data

US 2012/0087745 A1 Apr. 12, 2012

(30) Foreign Application Priority Data

Oct. 6, 2010 (WO) ................ PCT/BE2010/000070

(51) Int. Cl.
*B65G 53/00* (2006.01)

(52) U.S. Cl.
USPC ................ 406/197; 406/47; 406/88

(58) Field of Classification Search
CPC ............................................. B65G 2201/0247
USPC ........................................... 406/47, 88, 197
See application file for complete search history.

(56) References Cited

U.S. PATENT DOCUMENTS

| | | | | |
|---|---|---|---|---|
| 3,782,791 | A | * | 1/1974 | Neumann et al. ............. 384/116 |
| 3,904,255 | A | * | 9/1975 | Neumann et al. ................ 384/12 |
| 4,561,806 | A | * | 12/1985 | Lenhart ........................... 406/88 |
| 6,685,401 | B1 | * | 2/2004 | de Almeida Rodrigues et al. ............................... 406/11 |
| 2012/0097505 | A1 | * | 4/2012 | Berger et al. ............. 198/836.3 |

FOREIGN PATENT DOCUMENTS

| | | |
|---|---|---|
| EP | 1637482 A1 | 3/2006 |
| EP | 1494943 B1 | 6/2006 |
| WO | 01/12759 A2 | 2/2001 |

* cited by examiner

*Primary Examiner* — Joseph Dillon, Jr.
(74) *Attorney, Agent, or Firm* — Hovey Williams LLP

(57) ABSTRACT

Guiding system defining a moving path for containers having a collar, the system being adapted to be associated to a system for applying a pneumatic force on said containers so as move the containers the one after the other along the moving path according to a forward moving direction, the guiding system including at least a component for reducing the friction between at least the collar of the containers and guide profiles of the guide system, wherein the component includes lubricant dispensing channels having each an inlet, and an outlet associated to a groove.

17 Claims, 6 Drawing Sheets

TRANSPORT SYSTEM AND GUIDE SYSTEM FOR SUCH A TRANSPORT SYSTEM

FIELD OF THE INVENTION

The present invention relates to a guiding system for moving containers provided with a collar, so that the object are hung in a slideway. One or more pneumatic driving means are used for moving the containers in a transport direction.

THE STATE OF THE ART

Transport systems comprising a slideway including two guide profiles extending parallel to each other are known.

An inconvenience of such transport system is a relative high mutual friction between the collar projecting from the neck of the container or bottle and the guide profiles of the slide way.

Said relative high friction results in a significant loss of energy during the transport, and can result in decreased line efficiency due to blocking of containers in the slide way.

For trying to solve this problem, it has been suggested to lubricate the guide profiles (see EP 1637482).

However, it has been observed that the problem was not completely solved by using the system of the prior art.

It has now been discovered that the friction problem could further be reduced by associating the dispensing channel with a distributing lubricant groove, ensuring a further energy reduction for moving the containers, and ensuring a better coating of the guide profiles on substantially all the portions of the guide profiles in contact with the collar of the container. While not being bound to any theory, it seems that the system of that invention enables that some lubricant can coat a lateral portion of the collar of some containers, whereby enabling a kind of wiping effect on the guide profiles ensuring a better coating of the guide profiles.

BRIEF DESCRIPTION OF THE INVENTION

The invention relates thus to a guiding system defining a moving path for containers having a collar (such as bottles, plastic bottles, preforms, preforms adapted to be blown into bottles, etc), said system being adapted to be associated to a system for applying a pneumatic force on said containers so as move said containers the one after the other along the said moving path according to a forward moving direction. Such a guiding system may comprise at least:

a first guide profile having an upper support face adapted for supporting at least a first portion of the collar of containers, and a lateral guiding edge adapted for guiding at least a first portion of a lateral face of the containers;

a second guide profile having an upper support face adapted for supporting at least a second portion of the collar of containers, said second portion being different from said first portion of the collar of the containers, and a lateral guiding edge adapted for guiding at least a second portion of a lateral face of the containers different from said first portion of the lateral face;

wherein said first lateral edge is located in front of said second lateral guiding edge, but is distant from said second lateral edge so as to define there between the moving path for the containers or portion thereof, and a means for reducing the friction at least of the collar of the containers at least on the said upper faces of the said first and second guiding profiles, when said containers are moving along the path, wherein said means for reducing the friction of the collar of the containers at least on the said upper faces of the said first and second guiding profiles comprises:

a first dispensing channel associated to the first guide profile, said first dispensing channel having (a) an inlet adapted to be connected to a lubricant dispensing system adapted for dispensing lubricant under pressure (pressure can be a static pressure and/or a pressure provided by a pump, a cylinder, etc.) into the said first dispensing channel, and (b) an outlet with an outlet opening with an equivalent diameter comprised between 0.3 and 7 mm (advantageously between 0.5 and 5 mm) directed towards the upper support face of the first guide profile in the vicinity of the lateral guiding edge, wherein said outlet opening is associated to a first groove formed along the upper support face of the first guide profile, said first groove having:

a length path greater than the equivalent diameter of the said outlet opening advantageously comprised between 1 and 20 times the equivalent diameter of the said outlet opening, advantageously between 1.2 and 15 times the equivalent diameter of the said outlet opening, preferably comprised between 2 and 10 times the equivalent diameter of the said outlet opening, and a width, variable or not, the maximum width thereof being for example advantageously less than 5 times, preferably less than 3 times, most preferably lower than 2 times, the equivalent diameter of the said outlet opening, wherein said groove extends in a portion of the upper face of the first guide profile adapted to contact the first portion of the collar of the containers; and a second dispensing channel associated to the second guide profile, said second dispensing channel having (a) an inlet adapted to be connected to a lubricant dispensing system adapted for dispensing lubricant under pressure into the said second dispensing channel, and (b) an outlet with an outlet opening with an equivalent diameter comprised between 0.3 and 7 mm (advantageously between 0.5 mm and 5 mm) directed towards the upper support face of the second guide profile in the vicinity of the lateral guiding edge, wherein said outlet opening is associated to a second groove formed along the upper support face of the second guide profile, said second groove having:

a length path greater than the equivalent diameter of the said outlet opening advantageously comprised between 1 and 20 times the equivalent diameter of the said outlet opening, advantageously between 1.2 and 15 times the equivalent diameter of the said outlet opening, preferably comprised between 2 and 10 times the equivalent diameter of the said outlet opening, and a width, variable or not, the maximum width thereof being advantageously less than 5 times, preferably less than 3 times, most preferably lower than 2 times the equivalent diameter of the said outlet opening, wherein said groove extends in a portion of the upper face of the second guide profile adapted to contact the second portion of the collar of the containers.

Advantageously, each of the first groove and the second groove extends between a first end connected to the outlet opening of the first or second dispensing channel, said first end extending at a first distance from the lateral guiding edge of the first or second guide profile, and a second end extending at a second distance from the said lateral guiding edge of the first or second guide profile, wherein said second distance is lower than the said first distance and wherein the length of the groove is greater than the said first distance.

Preferably, said guiding system comprises at least a linear moving path portion with a linear moving axis defined between a linear portion of the lateral guide edge of the first guide profile and a linear portion of the lateral guide edge of the second guide profile, wherein each of the first and second grooves have a linear axis forming an angle comprised between 3° and 20°, advantageously between 4° and 10° with the linear moving axis.

Most preferably, the second end of each of the first and second grooves is located on the considered upper face of the first or second guide profile in a forward position with respect to the first end of the groove considered.

According to advantageous details of embodiments of the invention, each of the first and second grooves comprises a first groove portion above which a portion of the collar of the containers is adapted to move, and a second groove portion above which no portion of the collar of the containers is adapted to move, and/or each of the first and second grooves have a second end open along the lateral guide edge of respectively the first guide profile and the second guide profile, and/or each of the first and second grooves has a depth varying between a first depth in a portion adjacent to the first end, and a second depth in a portion adjacent to the second end, wherein the second depth is lower than the said first depth, and/or the depth of the first and second grooves varies progressively, advantageously substantially linearly from the first depth to said second depth, and/or the first depth is lower than 2 mm, advantageously lower than 1 mm, and/or each of the first and second guide profiles comprises an element adapted to rotate at least partly with respect to the considered guide profile, wherein said element comprises the outlet opening of the dispensing channel and at least a portion of the groove.

The invention further relates to a moving system comprising (a) a guiding system defining a moving path for containers having a collar, said system being a system according to the invention as disclosed here above or in the attached claims, and (b) a system for applying a pneumatic force on said containers so as move said containers the one after the other along the said moving path according to a forward moving direction.

The invention still further relates to a method of moving containers having a collar along a moving path of an embodiment of a guiding system according to the invention as disclosed here above or as claimed in one or more of the attached claims, in which a pneumatic force is applied on said containers so as to move said containers the one after the other along the said moving path according to a forward moving direction, and in which a quantity of lubricant is pushed intermittently through the outlet opening of the first dispensing channel and of the second dispensing channel respectively into the considered first groove and into the considered second groove.

Advantageously, the location of the grooves on the guide profiles is adapted for the collar of the containers to be moved, so that the said collar of the containers are not passing over a portion of the said grooves, advantageously over a portion of the said grooves adjacent to their outlet opening.

Details and characteristic of preferred embodiments of the invention will appear from the following description, in which reference is made to the attached drawings.

DESCRIPTION OF PREFERRED EMBODIMENTS

Figure 1:
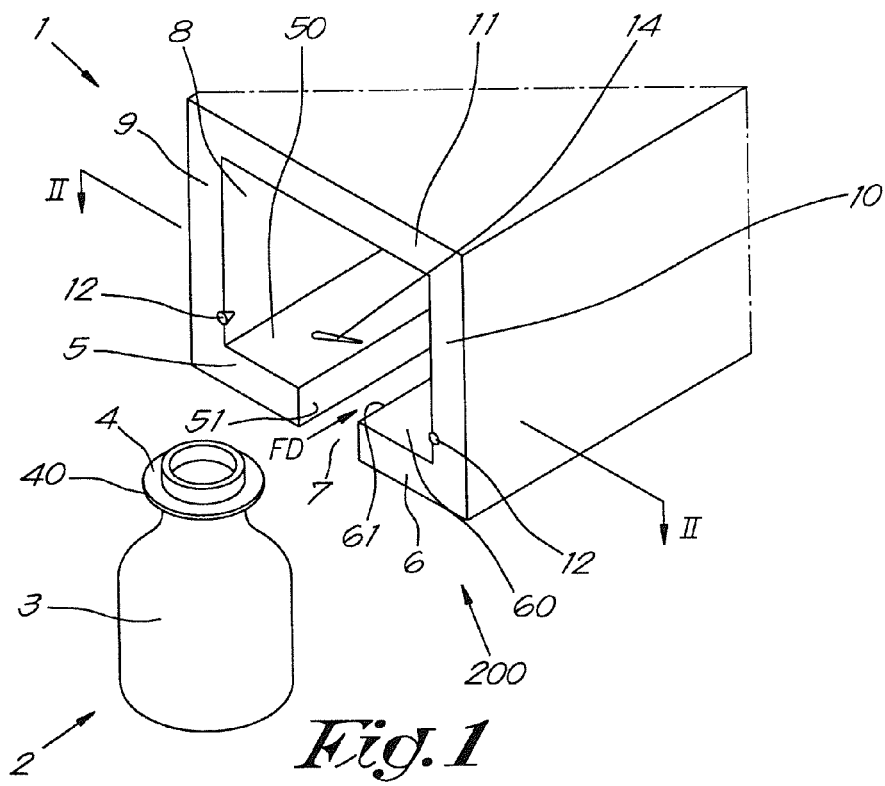
FIG. 1 is a partial perspective view of a transport system comprising a guiding system of the invention.

FIG. 1 is a view of a portion of a transport system 1 for containers 2, such as bottles, plastic bottles, preforms, preforms adapted to be blown into bottles, or the like, collectively herein "containers" or "bottles", with a neck 3 comprising a collar 4. The bottles 2 are intended to be moved within the transport system 1. The transport system 1 comprises two guide profiles 5,6 defining therebetween a channel 7 through which a portion of the bottle neck 3 can be moved, while portions of a bottom face of the collar 4 rest on the guide profiles 5,6. The bottles 2 are thus hung on said transport system. For moving the hung bottles, pneumatic forces are exerted on the bottle necks 3 located in a longitudinal chamber 8 defined by lateral walls 9,10, a cover 11 and the guide profiles 5,6. Said pneumatic forces are, for example, exerted by one or more air nozzles 12 (schematically represented) which are operatively connected by hoses or the like to a compressor or other source of pressurized air and adapted to create a flow of air within the chamber 8, so as to force the bottles to slide along the guide profiles 5,6 in a transport direction, here forward direction FD.

A guiding system 200 defines a moving path following the channel 7. The guiding system 200 preferably includes the first guide profile 5 and the second guide profile 6.

The first guide profile 5 has a first upper support face 50 adapted for supporting at least a first portion of the collar 4 of the containers 2, and a first lateral guiding edge 51 adapted for guiding at least a first portion of a lateral face of the neck portion located below the collar 4.

The second guide profile 6 has a second upper support face 60 adapted for supporting at least a second portion of the collar 4 of containers 2, the second portion being different from said first portion of the collar 4 of the containers, and a second lateral guiding edge 61 adapted for guiding at least a second portion of a lateral face of the neck portion located below the collar 4 different from said first portion of the lateral face.

The first lateral edge 51 is preferably located in front of the second lateral guiding edge 61, but is preferably distant from the second lateral edge so as to define therebetween the moving path 7 for the containers or portion thereof (neck portion).

A means 14,15 is provided for reducing the friction at least of the collar 4 of the containers such as bottles 2 at least on the upper faces 50,60 of the first and second guiding profiles 5,6, when said containers are moving along the path 7. The means 14,15 for reducing the friction of the collar 4 of the containers 2 at least on the upper faces 50,60 of the first and second guiding profiles 5,6 may include a first dispensing channel 140 associated to the first guide profile 5 and a second dispensing channel 150 associated to the second guide profile 6.

The first dispensing channel 140 preferably has (a) an inlet 141 adapted to be connected (for example by means of a click system or connector) to a lubricant dispensing system 20 and (b) an outlet 142 with an outlet opening with an equivalent diameter. The inlet 141 is connected to the lubricant dispensing system 20 via the piping 21, the lubricant dispensing system being controlled by a control unit 30, for example for controlling the intermittent supply of lubricant towards the inlet 141). The lubricant dispensing system 20 is adapted for dispensing lubricant, under pressure or not, into the first dispensing channel 140. The outlet 142 may have an equivalent diameter (the equivalent diameter of an opening or passage is equal to four times the surface of the opening or passage divided by the perimeter of the opening or passage) which may be, for example, between 1 and 5 mm (more preferably between 1 mm and 2 mm) and may be directed towards the upper support face (50) of the first guide profile 5 in the vicinity of the lateral guiding edge 51 (the opening 142 is for example located about 1 to 2 mm below the upper flat surface 50). The outlet opening 142 is associated (i.e., fluidically connected) to a first groove 16 foamed along the upper support face 50 of the first guide profile 5. The first groove 16 preferably includes a length path L which is preferably between 1 and 20 times (for example of about 5 mm to 10 mm) the equivalent diameter of the outlet opening 142, and a width W which may advantageously be less than 2 times the equivalent diameter of the said outlet opening 142. The groove 16 extends in a portion of the upper face of the first guide profile 5 adapted to contact the first portion of the collar 4 of the containers.

The second dispensing channel 150 is associated to the second guide profile 6, the second dispensing channel 150 having (a) an inlet 151 adapted to be connected to the lubricant dispensing system 20 and (b) an outlet 152 with an outlet opening. The inlet 151 may be connected to the lubricant dispensing system 20 via the piping 21, the lubricant dispensing system being controlled, for example, by the control unit 30, for example for controlling the intermittent supply of lubricant towards the inlet 151. The lubricant dispensing system 20 may be adapted for dispensing lubricant under pressure into the second dispensing channel. The outlet 152 may have an outlet opening with an equivalent diameter comprised between 1 and 5 mm directed towards the upper support face 61 of the second guide profile 6 in the vicinity of the lateral guiding edge 61. The outlet opening 152 may be fluidically connected, i.e. associated to a second groove 17 formed along the upper support face of the second guide profile. The second groove preferably has a length path L comprised between 1 and 20 times the equivalent diameter DC of the outlet opening 152, and a width W advantageously less than 2 times the equivalent diameter of the said outlet opening 152.

The second groove 17 extends in a portion of the upper face 60 of the second guide profile 6 and is adapted to contact the second portion of the collar 4 of the containers 2.

Each of the first groove 16 and the second groove 17 extends between a first end 161,171 connected to the outlet opening 142,152 of the first or second dispensing channel 140,150, the first end 161,171 extending at a first distance D1 from the lateral guiding edge 51,61 of the first or second guide profiles 5,6, and a second end 162,172 extending at a second distance from the lateral guiding edge of the first or second guide profiles. The second distance is less than the first distance and the length of the grooves is greater than the first distance. In the embodiments shown, the second distance is equal to zero, as the second end 162,172 of the groove 16,17 extends along the lateral face 51,61 of the guide profiles 5,6.

The moving path 7 defined between the guide profiles 5,6 can comprise one or more curved zones. In FIG. 1, a linear moving path portion is shown, said path portion having a linear moving axis AA defined between a linear portion of the lateral guide edge 51 of the first guide profile 5 and a linear portion of the lateral guide edge 61 of the second guide profile 6, wherein each of the first and second grooves 16,17 have a linear axis X-X, Y-Y forming an angle α, β comprised between 3° and 20°, advantageously between 4° and 10° with the linear moving axis A-A.

The second end 162, 172 of each of the first and second grooves 16,17 is located on the considered upper face 50,60 of the first or second guide profile in a forward position with respect to the first end of the groove considered.

Each of the first and second grooves comprises a first groove portion above which a portion of the collar 4 of the containers is adapted to move, and a second groove portion above which no portion of the collar 4 of the containers is adapted to move. This seems to be advantageous for having a better coating of the lateral edge 40 of the collar portion passing over a groove 16,17.

The forward distance dd between the position of the first end 161,171 and the second end 162, 172 is for example comprised between 5 mm and 15 mm.

In the embodiment shown in FIG. 1, each of the first and second grooves have a second end 162,172 open along the lateral guide edge 51,61 of respectively the first guide profile and the second guide profile. This seems also advantageous for ensuring some coating of the lateral edge 51,61 of the guide profiles 5,6.

Each of the first and second grooves has a depth varying between a first depth P1 in a portion adjacent to the first end 161,171, and a second depth P2 in a portion adjacent to the second end 162,172, wherein the second depth P2 is lower than the said first depth P1.

The depth of the first and second grooves 16,17 varies progressively, advantageously substantially linearly from the first depth P1 to said second depth P2.

For example, the first depth is lower than 2 mm, advantageously lower than 1 mm.

Figure 2:
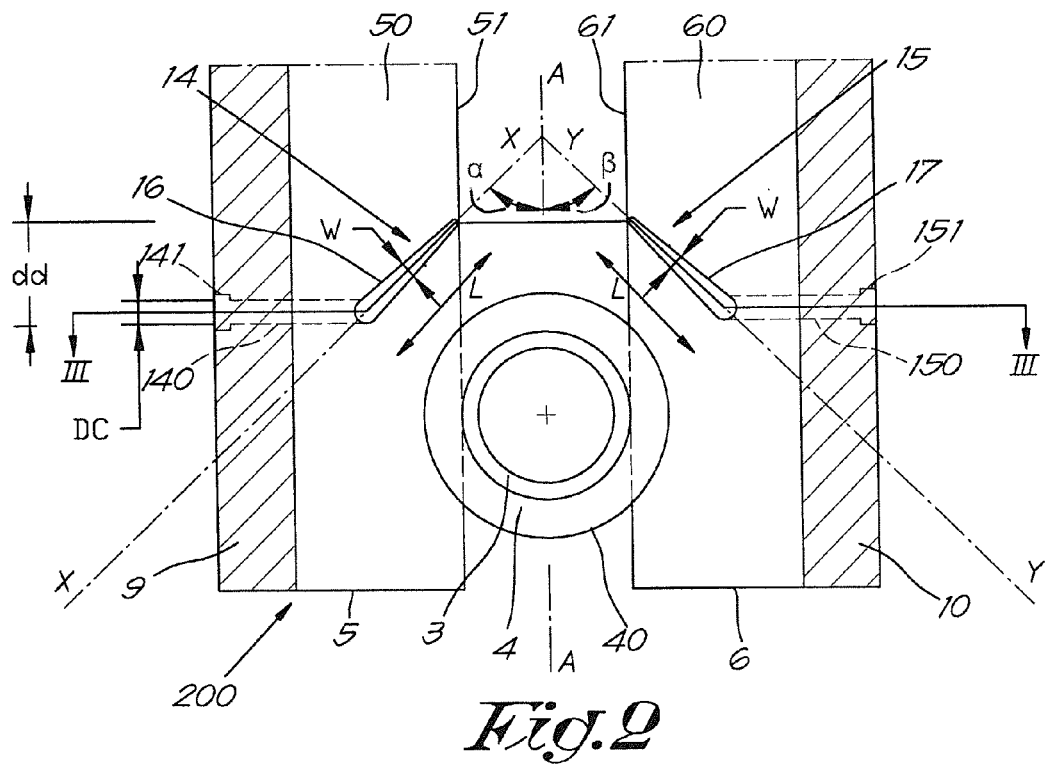
FIG. 2 is a fragmentary horizontal cross section view along the line II-II of the system of FIG. 1, with the position of the neck of a container such as a bottle being between two opposed guide profiles.
Figure 3:
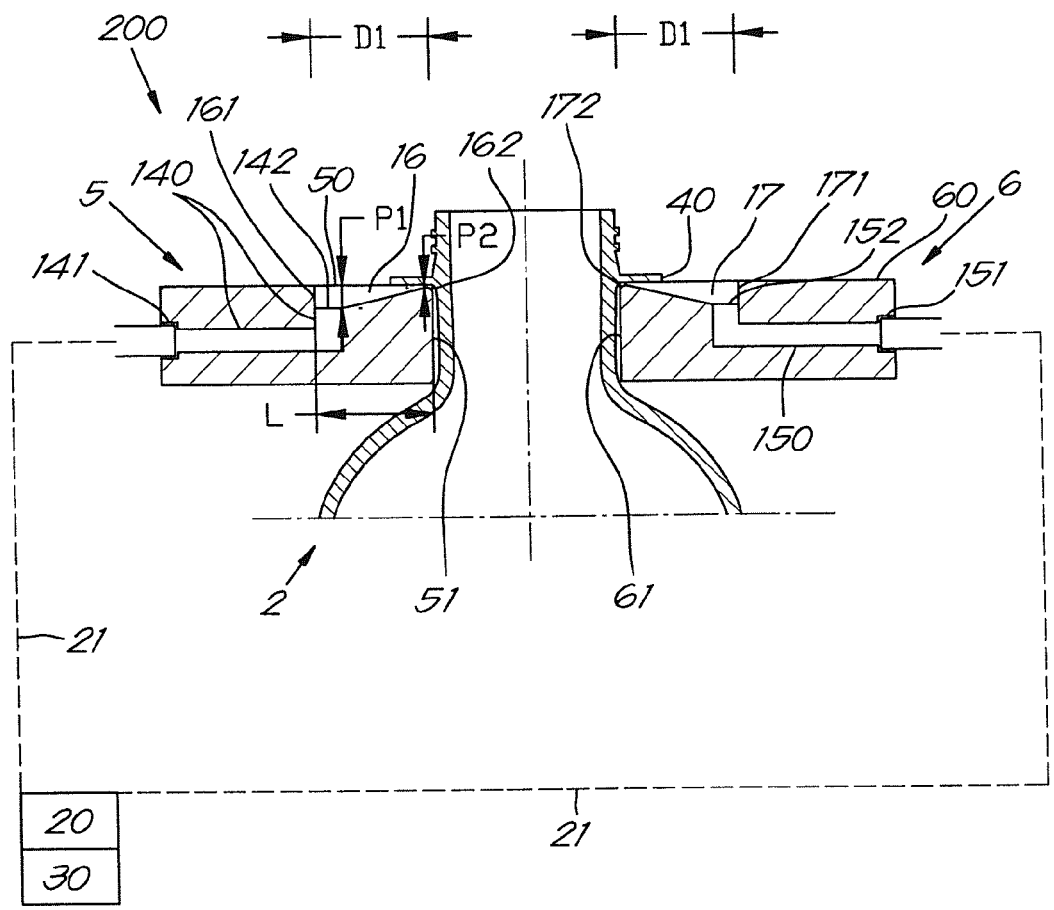
FIG. 3 is an enlarged fragmentary vertical cross section view of the system of FIG. 2 taken along the line of FIG. 2.
Figure 4:
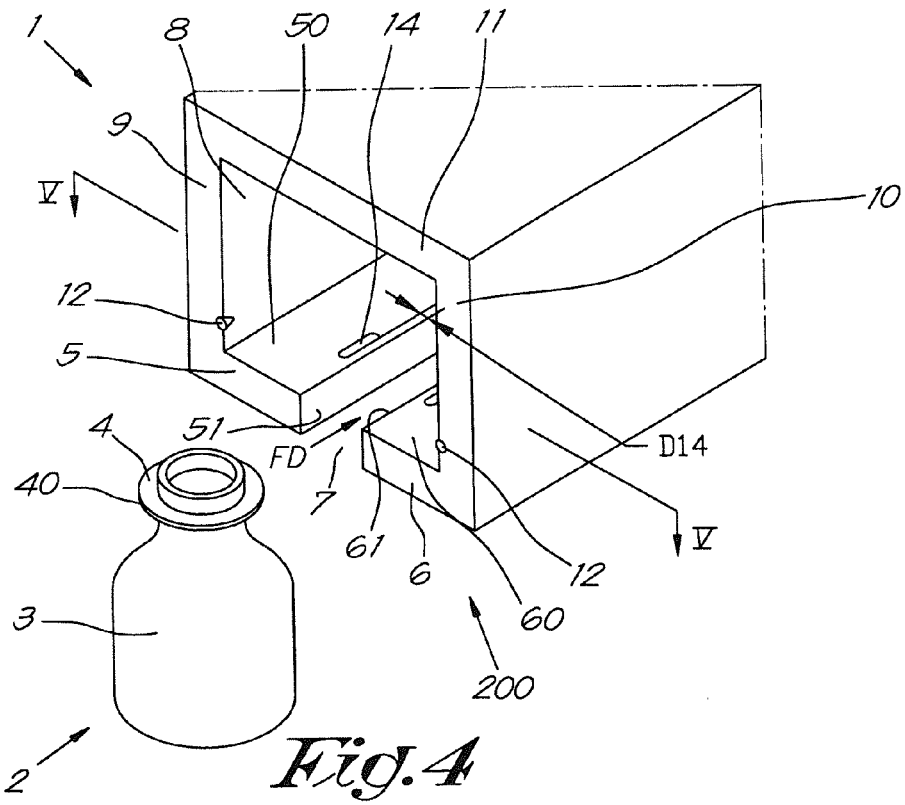
FIG. 4 is a partial perspective view of a second embodiment of the transport system of the present invention similar to the system as shown in FIG. 1, showing grooves extending in a direction parallel to the moving direction of the containers.
Figure 5:
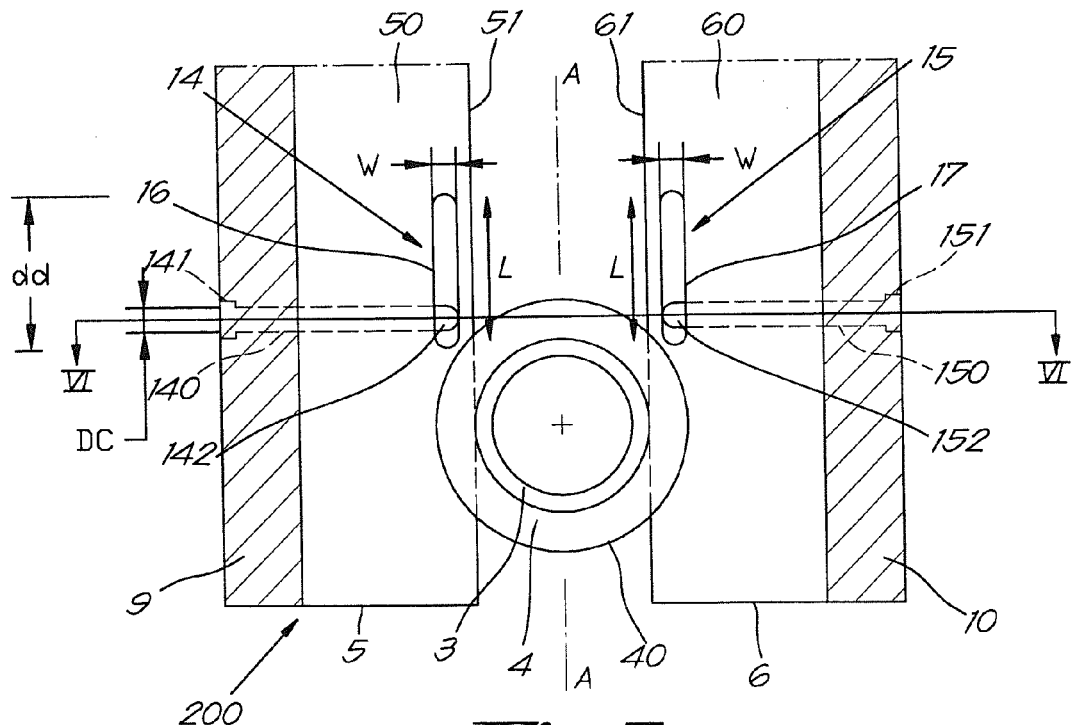
FIG. 5 is a fragmentary horizontal cross section view similar to FIG. 2 taken along line V-V of FIG. 4, which includes a top plan view of the guide profiles of FIG. 4.
Figure 6:
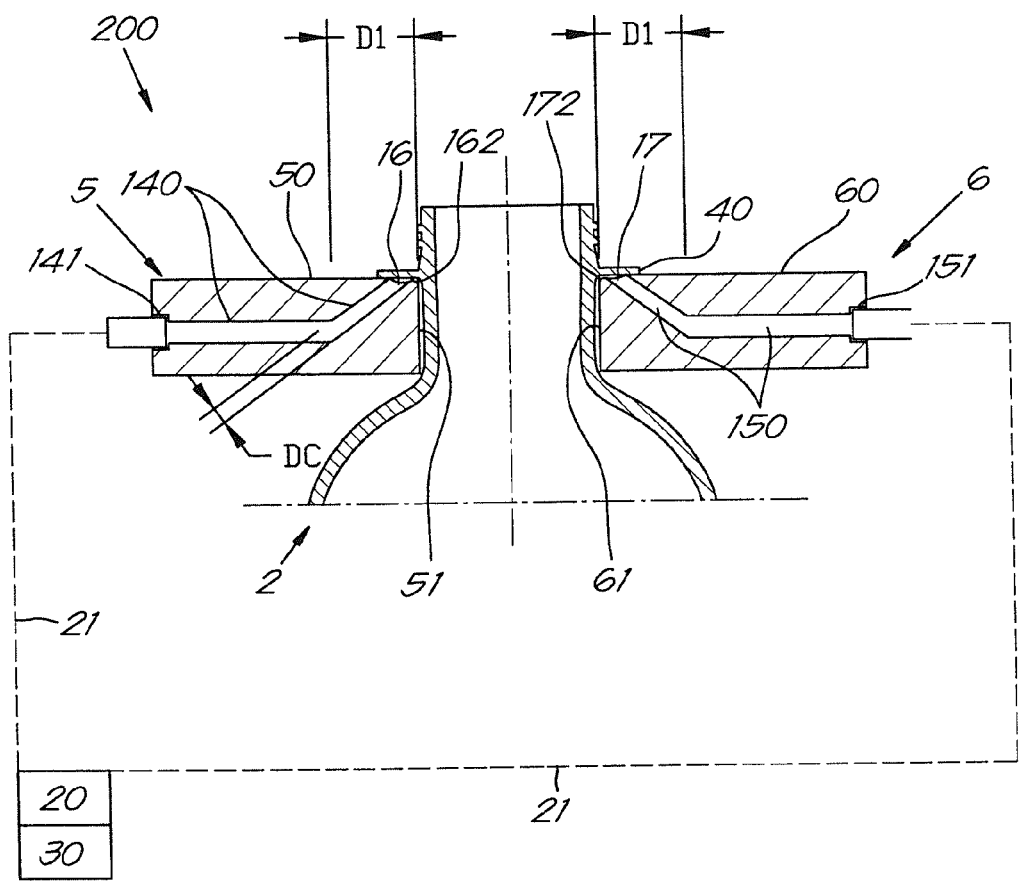
FIG. 6 is an enlarged fragmentary vertical cross section view of the system of FIG. 4 taken along the line VI-VI of FIG. 5.

The embodiment shown in FIGS. 4 to 6 is similar to that shown in FIGS. 1 to 3, except that the grooves 16,17 extend parallel to the moving direction FD. In the embodiment shown, the grooves 16,17 have a central axis parallel to the lateral edges 51,61 of the guide profiles 5,6. Said grooves extend partly or completely in the round portions between the flat upper face 50,60 and the lateral edge 51,61 of the guide profiles 5,6, but preferably at least partly in the upper flat face 50,60. The distance D14 is advantageously less than 2 mm, for example less than 1 mm. In the embodiment of FIG. 4, the collar of a moving bottle is adapted to pass completely over the grooves 16,17, and even preferably to cover the said grooves at least during a period of the movement of the bottle.

Each groove 16,17 is connected to the end opening or outlet 142,152 of the channel 140,150. In the embodiment shown, the outlet 142,152 is located between the ends 161,171;162, 172 of the respective groove 16,17. In other possible embodiments, the grooves 16,17 are located with respect to a respective one of the outlets 142,152, so that such respective outlet 142,152 is located at or at about one of said ends of the corresponding groove. According to another embodiment, the outlets 142,152 of the channels 140,150 are connected to a respective one of the grooves 16,17 by means of a widening connecting portion or element, for example widening the outlet opening 142,152 up to about the size of the groove or a large portion of the size of the groove.

Figure 7:
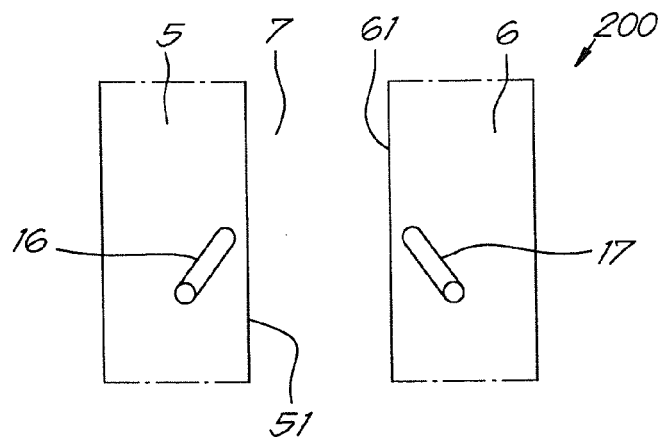
FIGS. 7, 8 and 9 are fragmentary top plan views of embodiments of guide profiles of guide system of the invention showing alternate configurations of the grooves.

In FIG. 7, the guide profiles 5,6 are similar to that of the device of FIG. 1, except that the second end 162,172 of the grooves 16,17 are not open along the lateral edge 51,61 of the guide profiles 5,6.

Figure 8:
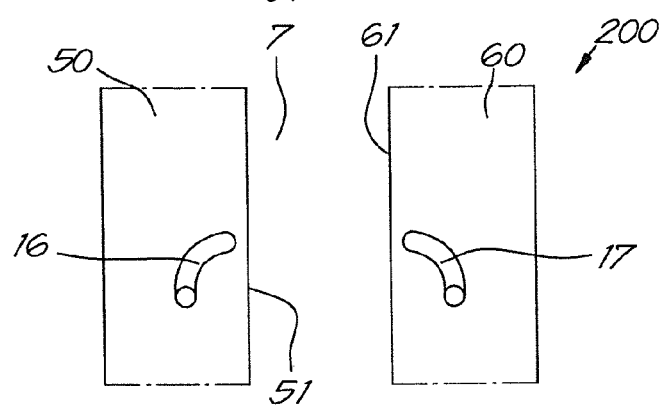

In FIG. 8, the grooves have a curved shape along the upper face 50,60, for example a shape following substantially a portion of a circle circumference.

Figure 9:
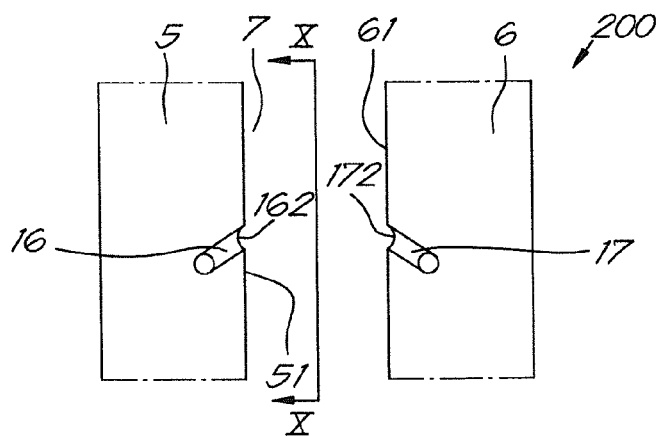
Figure 10:
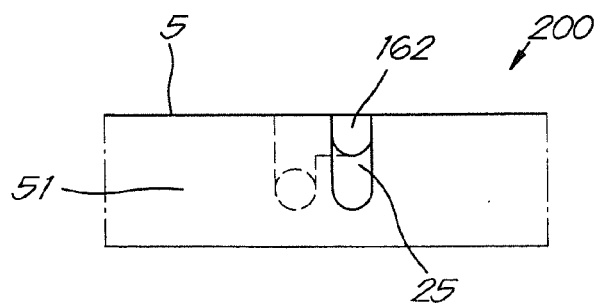
FIG. 10 is a fragmentary side elevational view of a guide profile of the system of FIG. 9, taken along the line X-X of FIG. 9.

In FIGS. 9 and 10, the grooves 16, 17 are similar to that of the embodiment of FIG. 1, except that the second opening 162,172 of each of the grooves are prolonged with a channel 25, such as a vertical channel extending along the lateral edge 51,61 of the guide profiles 5,6.

Figure 11:
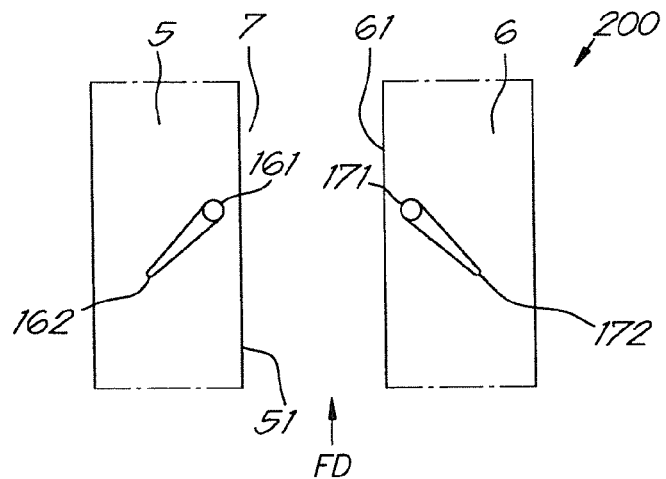
FIG. 11 is a fragmentary top plan view of a further alternate embodiment of guide profiles of a guide system of the invention.

In FIG. 11, the first end 161,171 of each of the grooves 16,17 are located nearer the lateral edge 51,61 than the second end of the groove. Moreover, the first end 161,171 is located in a forward position with respect to the location of the second end, with respect to the movement of the container (arrow FD).

Figure 12:
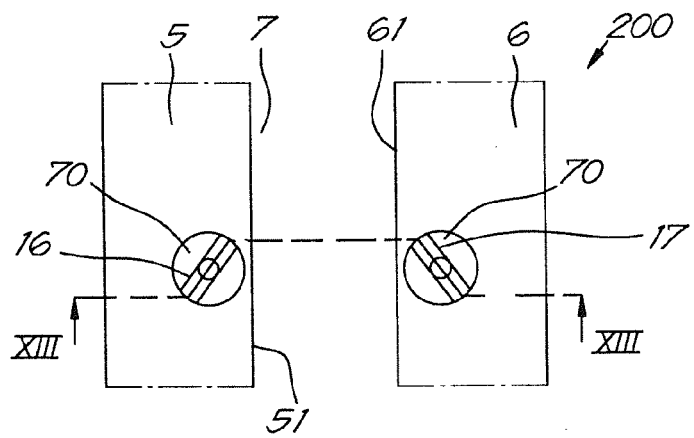
FIG. 12 is a fragmentary top plan view of still further alternate embodiment of guide profiles of a guide system of the invention.
Figure 13:
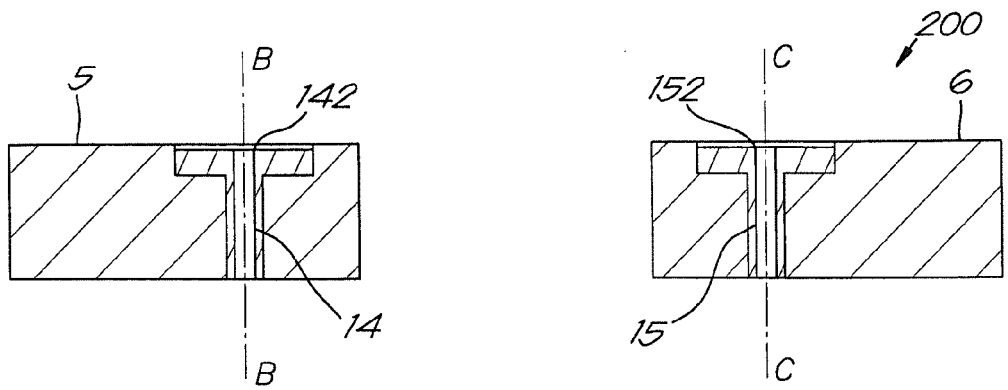
FIG. 13 is an enlarged fragmentary vertical cross section view taken along the line XIII-XIII of FIG. 12.

In FIG. 12, each of the first and second guide profiles 5,6 comprises an element 70 adapted to rotate (vertical axis B-B or C-C) at least partly with respect to the considered guide profile, wherein said element comprises the outlet opening 142,152 of the dispensing channel 14,15 and at least a portion of the groove 16,17. By rotating the element 70 with respect to the guide profile 5 or 6, it is possible to adjust the position of the groove as required. Possibly the rotation of the movement of the element 70 can be intermittent or continuous.

The lubricant suitable for the moving of containers 2 such as bottles, for example PET bottles, or preforms is for example lubricant containing one or more fluoro containing compounds, such as PTFE.

The distance D14 between on the one hand, the end 162, 172 of the groove 16 or 17 directed towards respectively the lateral edge 51 or 61, and on the other hand the vertical plane in which extends the considered lateral edge is advantageously lower than 5 mm, such as lower than 3 mm. In case the lateral edge 51,61 is curved, the end 162,172 is advantageously adjacent to or located into the curved portion extending between the considered upper face 50,60 and the considered lateral edge.

What I claim is:

1. A method of moving containers having a collar along a moving path comprising the steps of:

(A) providing a guiding system, said guiding system comprising:
   a first guide profile having an upper support face adapted for supporting at least a first portion of the collar of containers, and a lateral guiding edge adapted for guiding at least a first portion of a lateral face of the containers;
   a second guide profile having an upper support face adapted for supporting at least a second portion of the collar of containers, said second portion being different from said first portion of the collar of the containers, and a lateral guiding edge adapted for guiding at least a second portion of a lateral face of the containers different from said first portion of the lateral face;
   wherein said first lateral edge is located in front of said second lateral guiding edge, but is distant from said second lateral edge so as to define there between the moving path for at least a portion of the containers, and
   a means for reducing the friction at least the collar of the containers at least on the said upper faces of the said first and second guiding profiles, when said containers are moving along the path, wherein said means for reducing the friction of the collar of the containers at least on the said upper faces of the said first and second guiding profiles comprises:
      a first dispensing channel associated to the first guide profile, said first dispensing channel having (a) an inlet adapted to be connected to a lubricant dispensing system adapted for dispensing lubricant under pressure into the said first dispensing channel, and (b) an outlet with an outlet opening with an equivalent diameter comprised between 0.3 and 7 mm directed towards the upper support face of the first guide profile in the vicinity of the lateral guiding edge, wherein said outlet opening is associated to a first groove formed along the upper support face of the first guide profile, said first groove having:
         a length path greater than the equivalent diameter of the said outlet opening comprised between 1 and 20 times the equivalent diameter of the said outlet opening, and
         a maximum width,
      wherein said groove extends in a portion of the upper face of the first guide profile adapted to contact the first portion of the collar of the containers; and
      a second dispensing channel associated to the second guide profile, said second dispensing channel having (a) an inlet adapted to be connected to a lubricant dispensing system adapted for dispensing lubricant under pressure into the said second dispensing channel, and (b) an outlet with an outlet opening with an equivalent diameter comprised between 0.3 and 7 mm directed towards the upper support face of the second guide profile in the vicinity of the lateral guiding edge, wherein said outlet opening is associated to a second groove formed along the upper support face of the second guide profile, said second groove having:
         a length path greater than the equivalent diameter of the said outlet opening comprised between 1 and 20 times the equivalent diameter of the said outlet opening, and
         a maximum width, wherein said groove extends in a portion of the upper face of the second guide profile adapted to contact the second portion of the collar of the containers;

(B) applying a pneumatic force on said containers;

(C) moving said containers the one after the other along the said moving path according to a forward moving direction; and (D) intermittently pushing a quantity of lubricant through the outlet opening of the first dispensing channel and of the second dispensing channel respectively into the considered first groove and into the considered second groove.

2. The method of claim 1, in which the location of the grooves on the guide profiles is adapted for the collar of the containers to be moved, so that during said moving step, the collars of the containers are not passing over a portion of the said grooves.

3. The method of claim 1, in which the location of the grooves on the guide profiles and the length of the grooves are adapted so that during the moving of a collar above the grooves, at least for a period of time, the said grooves are substantially fully covered by the collar.

4. The method of claim 1, in which the first and second grooves have each:
a length path greater than the equivalent diameter of the said outlet opening comprised between 1.2 and 15 times the equivalent diameter of the said outlet opening respectively of the first dispensing channel and of the second dispensing channel, and
a maximum width lower than 3 times the equivalent diameter of the outlet opening respectively of the first dispensing channel and of the second dispensing channel.

5. The method of claim 1, in which the first and second grooves have each:
a length path greater than the equivalent diameter of the said outlet opening comprised between 2 and 10 times the equivalent diameter of the said outlet opening respectively of the first dispensing channel and of the second dispensing channel, and
a maximum width lower than 2 times the equivalent diameter of the outlet opening respectively of the first dispensing channel and of the second dispensing channel.

6. The method of claim 1, in which the first groove extends between a first end connected to the outlet opening of the first dispensing channel, said first end extending at a first distance from the lateral guiding edge of the first guide profile, and a second end extending at a second distance from the said lateral guiding edge of the first guide profile, wherein for said first groove, said second distance is lower than the said first distance, while the length of the first groove is greater than the said first distance, and
in which the second groove extends between a first end connected to the outlet opening of the second dispensing channel, said first end extending at a first distance from the lateral guiding edge of the second guide profile, and a second end extending at a second distance from the said lateral guiding edge of the second guide profile, wherein for said second groove, said second distance is lower than the said first distance, while the length of the second groove is greater than the said first distance.

7. The method of claim 6, wherein said guiding system comprises at least a linear moving path portion with a linear moving axis defined between a linear portion of the lateral guide edge of the first guide profile and a linear portion of the lateral guide edge of the second guide profile, wherein each of the first and second grooves have a linear axis forming an angle comprised between 3° and 20° with the linear moving axis.

8. The method of claim 1, in which the first groove extends between a first end connected to the outlet opening of the first dispensing channel, said first end extending at a first distance from the lateral guiding edge of the first guide profile, and a second end extending at a second distance from the said lateral guiding edge of the first guide profile, wherein for said first groove, said second distance is lower than the said first distance, while the length of the first groove is greater than the said first distance, and in which the second groove extends between a first end connected to the outlet opening of the second dispensing channel, said first end extending at a first distance from the lateral guiding edge of the second guide profile, and a second end extending at a second distance from the said lateral guiding edge of the second guide profile, wherein for said second groove, said second distance is lower than the said first distance, while the length of the second groove is greater than the said first distance, wherein said guiding system comprises at least a linear moving path portion with a linear moving axis defined between a linear portion of the lateral guide edge of the first guide profile and a linear portion of the lateral guide edge of the second guide profile, wherein each of the first and second grooves have a linear axis forming an angle comprised between 4° and 10° with the linear moving axis.

9. The method of claim 1, in which the first groove extends between a first end connected to the outlet opening of the first dispensing channel, said first end extending at a first distance from the lateral guiding edge of the first guide profile, and a second end extending about at the said lateral guiding edge of the first guide profile, wherein the length of the first groove is greater than the said first distance, and in which the second groove extends between a first end connected to the outlet opening of the second dispensing channel, said first end extending at a first distance from the lateral guiding edge of the second guide profile, and a second end extending about at the said lateral guiding edge of the second guide profile, wherein the length of the second groove is greater than the said first distance.

10. The method of claim 9, wherein said guiding system comprises at least a linear moving path portion with a linear moving axis defined between a linear portion of the lateral guide edge of the first guide profile and a linear portion of the lateral guide edge of the second guide profile, wherein each of the first and second grooves have a linear axis forming an angle comprised between 3° and 20° with the linear moving axis.

11. The method of claim 1, in which the first groove extends between a first end connected to the outlet opening of the first dispensing channel, said first end extending at a first distance from the lateral guiding edge of the first guide profile, and a second end extending about at the said lateral guiding edge of the first guide profile, wherein the length of the first groove is greater than the said first distance, and in which the second groove extends between a first end connected to the outlet opening of the second dispensing channel, said first end extending at a first distance from the lateral guiding edge of the second guide profile, and a second end extending about at the said lateral guiding edge of the second guide profile, wherein the length of the second groove is greater than the said first distance, wherein said guiding system comprises at least a linear moving path portion with a linear moving axis defined between a linear portion of the lateral guide edge of the first guide profile and a linear portion of the lateral guide edge of the second guide profile, wherein each of the first and second grooves have a linear axis forming an angle comprised between 4° and 10° with the linear moving axis.

12. The method of claim 1, in which the first groove extends between a first end connected to the outlet opening of the first dispensing channel, said first end extending at a first distance from the lateral guiding edge of the first guide profile, and a second end extending at a second distance from the said lateral guiding edge of the first guide profile, wherein for said first groove, said second distance is lower than the said first distance, while the length of the first groove is greater than the said first distance, in which the second groove extends between a first end connected to the outlet opening of the second dispensing channel, said first end extending at a first distance from the lateral guiding edge of the second guide profile, and a second end extending at a second distance from the said lateral guiding edge of the second guide profile, wherein for said second groove, said second distance is lower than the said first distance, while the length of the second groove is greater than the said first distance, and in which the second end of each of the first and second grooves is located on the considered upper face of the first or second guide profile in a forward position with respect to the first end of the groove considered.

13. The method of claim 1, in which each of the first and second grooves has a depth varying between a first depth in a portion adjacent to the first end, and a second depth in a portion adjacent to the second end, wherein the second depth is lower than the said first depth.

14. The method of claim 13, in which the depth of the first and second grooves varies progressively from the first depth to said second depth.

15. The method of claim 13, in which the depth of the first and second grooves varies linearly from the first depth to said second depth.

16. The method of claim 1, in which each of the first and second grooves has a depth varying between a first depth in a portion adjacent to the first end, and a second depth in a portion adjacent to the second end, wherein the second depth is lower than the said first depth, wherein the first depth is lower than 2 mm.

17. The method of claim 1, in which each of the first and second grooves has a depth varying between a first depth in a portion adjacent to the first end, and a second depth in a portion adjacent to the second end, wherein the second depth is lower than the said first depth, wherein the first depth is lower than 1 mm.

* * * * *